United States Patent [19]
Fields, Jr. et al.

[11] Patent Number: 6,101,563
[45] Date of Patent: Aug. 8, 2000

[54] CONFIGURATION ACCESS SYSTEM

[75] Inventors: James Stephen Fields, Jr.; Guy Lynn Guthrie, both of Austin; Kenneth Alan Riek, Round Rock, all of Tex.

[73] Assignee: International Business Machines Corporation, Armonk, N.Y.

[21] Appl. No.: 09/080,031

[22] Filed: May 15, 1998

[51] Int. Cl.[7] .................................................. G06F 13/00
[52] U.S. Cl. ........................... 710/104; 710/128; 710/129
[58] Field of Search .................................... 710/104, 126, 710/128, 129; 364/240, 240.3

[56] References Cited

U.S. PATENT DOCUMENTS 5,664,152  9/1997  Ezzet ........................................ 711/153
5,898,894  4/1999  Gray et al. ................................ 710/58

*Primary Examiner*—Ario Etienne
*Attorney, Agent, or Firm*—Robert V. Wilder; Volel Emile

[57] ABSTRACT

A methodology and implementing system are provided in which PCI system configuration data is made available to a host X86 system CPU through an intermediate PowerPC system. A bus converter circuit connected between the X86 bus and the PowerPC bus is effective to translate configuration addresses between the X86 and the PowerPC system. A PCI host bridge arrangement includes a primary PCI host bridge circuit and a plurality of secondary peer PCI host bridge circuits. The primary host bridge circuit is effective to process configuration data requests from the bus converter circuit which are directed to any of the secondary PCI host bridge circuits.

11 Claims, 6 Drawing Sheets

CONFIGURATION ACCESS SYSTEM

FIELD OF THE INVENTION

The present invention relates generally to information processing systems and more particularly to an improved methodology for accessing system configuration information in a computer related environment.

BACKGROUND OF THE INVENTION

As computer systems and networked computer systems proliferate, and become integrated into more and more information processing systems which are vital to businesses and industries, there is an increasing need for faster information processing and greater interoperability among various systems. Currently, application programs are being run on a plurality of computer system architectures and operating systems across a plurality of network interconnections. Each program requires access to the system configuration of each system with which the program may communicate. To acquire this configuration information, the application program, or the operating system running the application program, must access the system configuration file for the target system. These configuration accesses are handled in differing ways for different systems.

The PCI (Peripheral Component Interconnect) Specification (PCI Local Bus Specification, Revision 2.1, Jun. 1, 1995), specifies the use of a register and a port to handle PCI configuration accesses. The register, which serves as a pointer, is called the Configuration Address Register. The port is called the Configuration Data Register. To support configuration operations to the PCI bus for software, certain specific addresses were required to be used, e.g. 32 bit I/O addresses of x'000 0CF8' and x'000 0CFC where the "CF8" address is used for configuration address information and the "CFC" address is used for the configuration data. The original "PowerPC" definition of a PCI Host Bridge (PHB) required that these addresses be at addresses x'000F 8000 and x'000F 801X in memory space, respectively. In implementing a common PHB for both of the above systems, it is necessary to merge both design points into an existing PowerPC PHB design.

Thus, there is a need for an improved information processing methodology and system in which system configuration information is made available on a common basis for access by a plurality of computer system specifications.

SUMMARY OF THE INVENTION

A method and apparatus is provided in which PCI configuration space is accessible by both the PCI address map definition from the PCI Specification, as well as the PHB architecture address map definition from the PowerPC PHB Specification. In an exemplary embodiment, PCI system configuration data is made available to a host X86 system CPU through an intermediate PowerPC system. A bus converter circuit connected between the X86 bus and the PowerPC bus is effective to translate configuration addresses between the X86 and the PowerPC system. A PCI host bridge arrangement includes a primary PCI host bridge circuit and a plurality of secondary PCI host bridge circuits. The primary host bridge circuit is effective to process configuration data requests from the bus converter circuit which are directed to any of the secondary PCI host bridge circuits.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
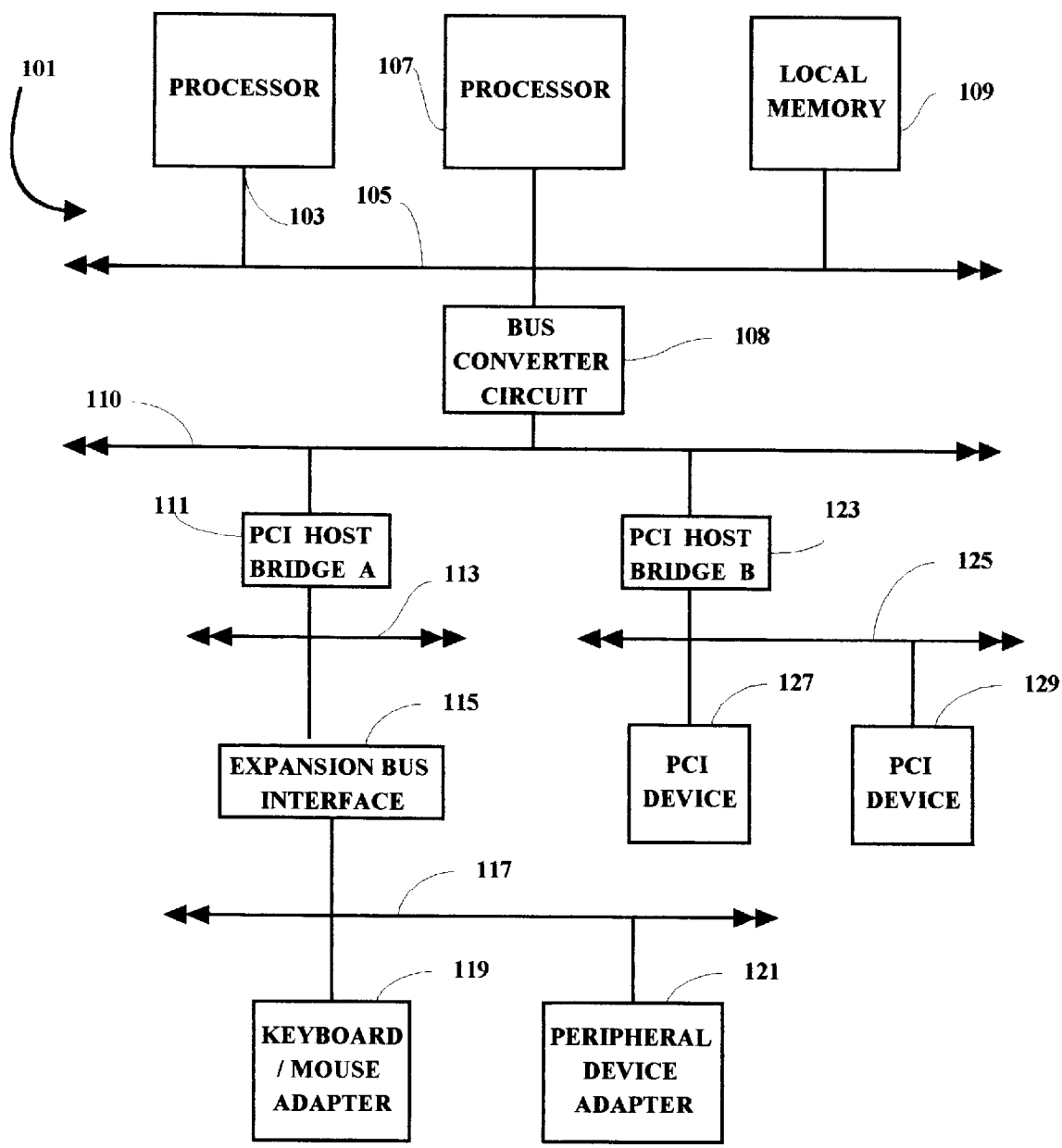
FIG. 1 is a block diagram of a typical computer related information processing system in which an exemplary embodiment of the present invention may be implemented.

The various methods discussed herein may be implemented within a typical computer system 101 as illustrated in FIG. 1, which may include one or more computers or workstations in various combinations. An exemplary hardware configuration of a computer system which may be used in conjunction with the present invention is illustrated and includes a processor device 103, such as a conventional microprocessor, and a number of other units interconnected through a host bus 105, which may be any host system bus. The system bus may have one or more additional processors connected to the bus such as processor 107. It is noted that the processing methodology disclosed herein will apply to many different bus and/or network configurations. The bus 105, as well as any of the other busses illustrated, may be extended as shown to include further connections to other computer systems, workstations or networks, and other peripherals and the like. The computer system shown in FIG. 1 includes a local memory 109. A local bus controller and DRAM system memory (not shown) are also typically connected to the system bus 105.

The host bus 105 is shown connected through a bus converter circuit 108 to another system bus 110. PCI (Peripheral Component Interconnect) Host Bridge A circuit 111 is connected between the bus 110 and bus 113, which, in turn, is connected through an expansion bus interface circuit 115 to an expansion bus 117 in the present example. The expansion bus 117 may include connections to a keyboard/mouse adapter 119 and also to other peripheral device adapters such as peripheral device adapter 121. The system bus 105 may also be connected through additional bridge circuits such as PCI Host bridge B 123, to a corresponding PCI bus 125 to which additional PCI devices 127 and 129 may be connected.

Figure 2:
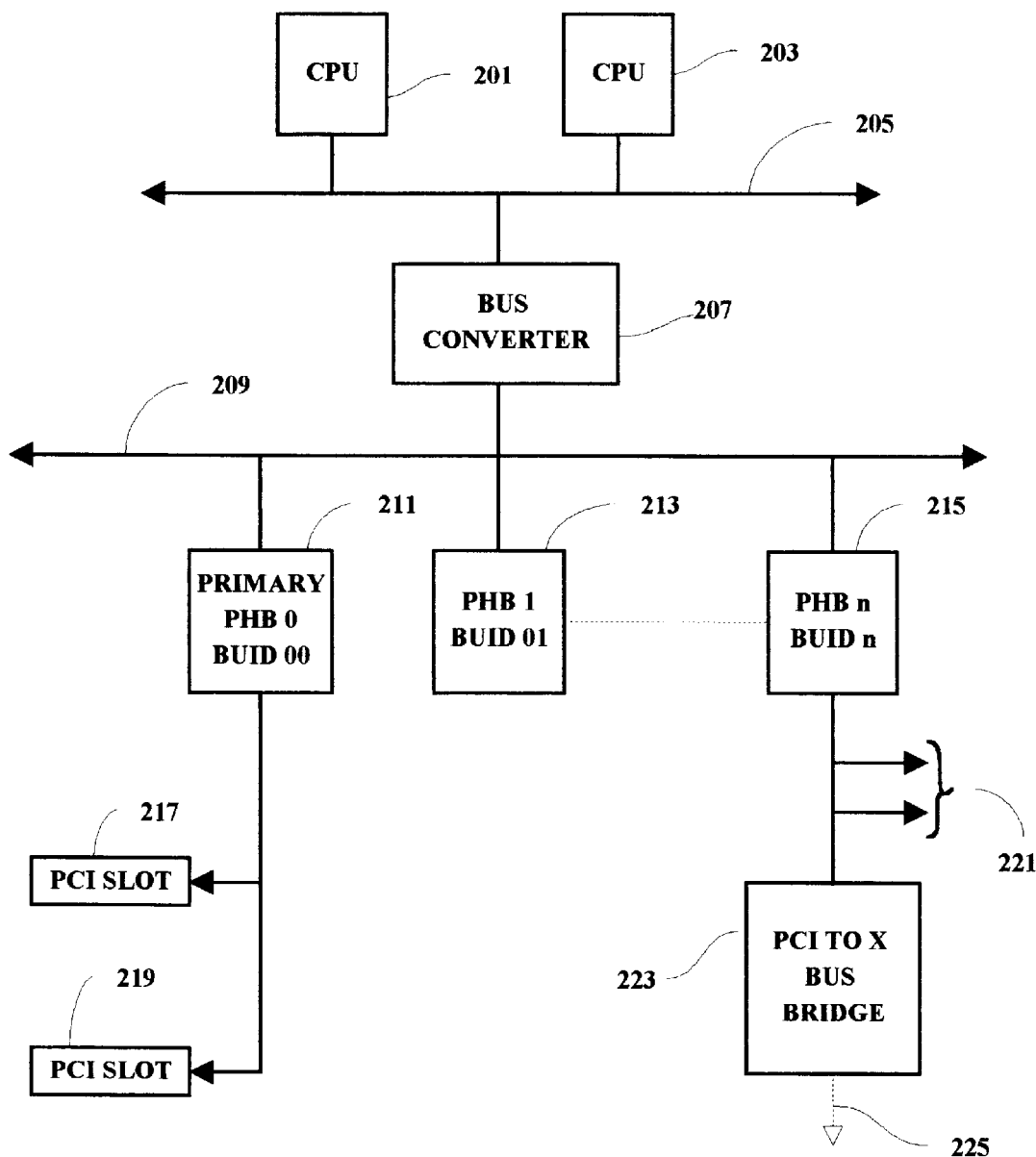
FIG. 2 is an example of a typical PCI bus arrangement in a host computer system.

In FIG. 2, there is shown a simplified typical PCI bus arrangement in a host computer system. CPU devices 201 and 203 are illustrated as being connected to a host system bus 205 such as an X86 system bus. A bus converter device 207 is connected between the Host bus 205 and a system bus 209 such as a PowerPC bus. A series of PHB (PCI Host Bridge) circuits 211, and 213 through 215 are coupled to the system bus 209. Each of the PHBs have a PHB number (PHB "0"–PHB "n") associated with it as well as a corresponding BUID (Bus Unit Identifier) BUID "00" through BUID "n", respectively. The first PHB 211 is designated as a "primary" PHB and the other PHBs are secondary PHBs. PHB 211 is shown connected to a PCI bus with two PCI slots 217 and 219. Similarly, PHB device 215 may be connected to a PCI bus with two slots 221 and also to a PCI to "X" bus bridge circuit 223. The "X" bus may, for example, be an ISA bus.

In operation, as programs are running and instructions are executing on a system (especially a multi-scalar system with multiple CPUs), in order to maintain strict ordering of operations and avoid conflicts between multiple CPUs, accesses to CPU registers, including "read" operations and "write" operations, are required to be "atomic". Such read and write operations or transfers are considered "atomic" in that they must be completed before another instruction can be executed. In an X86-based system, this is accomplished via "IN" and "OUT" instructions. For IN transfers, the read data must be returned to complete the operation. For OUT transfers, the store must complete at the "target" (a destination device for data which is specified in an instruction) and the processor must be made aware of the completion via hardware signal "handshaking".

To satisfy that requirement, the exemplary embodiment implements a subset of the PowerPC "T=1" protocol. The "T=1" protocol defines two PIO (Programmed I/O) operations, i.e. "PIO Store Last" and "PIO Load Last". Those operations function such that if a PIO Load is issued, it is not completed until the load data is returned. If a PIO store is issued, a PIO store reply (an address-only packet) is sent back to the initiator to indicate a successful completion of the IN instruction because the Load Data serves to complete the instruction. The PIO Store is made to work with the OUT instruction through additional hardware that converts the PIO store reply packet into the hardware handshaking signal to the processor.

Inherent in the T=1 architecture is the use of a BUID (Bus Unit ID) that acts as a decode mechanism for multiple I/O devices. As hereinbefore noted, each PHB in the present example has a unique BUID in order to be able to identify which PIO operations are targeting the PHB. In the present example, T=1 addresses are 32 bit address and each PHB decodes a full 4G (four gigabyte) address range. The BUID is used to distinguish which 4G range of T=1 addresses are being targeted.

For IN/OUT instructions destined for PCI I/O space, the processor reads from or writes to the appropriate address and the bus converter will then generate the same read or write, and calculate the correct BUID. The PHB decodes the BUID and passes the address through to the PCI bus as an I/O read or write.

The configuration address and configuration data registers are physically contained in each PHB (211, 213 and 215) and operate as follows. When the processor does a "write" to the Configuration Address Register, the PHB updates the contents of its register. Any accesses ("reads" or "writes") to the Configuration Data Register that follow will cause the PHB to compare its configured value of its Bus Number and Subordinate Number with the value of the Bus Number that is written into the Configuration Address Register. The configured value is written into separate PHB registers and each PHB gets a different range of Bus Numbers and Subordinate Bus Numbers. If the Bus Number in the Configuration Address Register matches this range, then the access to the Configuration Data Register is destined for the PCI Bus below that PHB. If the Bus Number do not match, then accesses to the Configuration Data Register are ignored since such accesses are destined for a different PHB and hence a different PCI bus.

In an X86-based machine designed to run in accordance with the PCI Specification, the Configuration Address Register must be located at I/O address "x'000 0CF8". Additionally, all PHBs must have this register at the same address because all PHBs must receive all writes to this register so that they all simultaneously have the same value. This is required so that when an access to the Configuration Data Register occurs, all of the PHBs can do the compare of the Bus Numbers and they all have the current value in the Configuration Address Register for the compare operation.

However, the requirement that all PHBs have the Configuration Address Register at the same address does not match the "T=1" architecture definition which has each PHB at a different BUID. Thus, in the present example, for the T=1 addresses x'000 0CF8 and x'000 0CFC, the BUID that will be presented will be that of the primary PHB. The primary PHB may, for example, be determined by a pin on one (and only one) of the PHBs being tied active on the printed circuit board. All PHBs that are not the primary PHB must ignore the BUID for any accesses to those addresses. Although all non-primary PHBs must ignore the BUID for accesses to those addresses, these non-primary PHBs must decode the T=1 addresses.

The T=1 definition also requires a PIO store reply from the PHB following PIO stores. If all PHBs must accept a single PIO store to CF8, they would all generate a PIO store reply for that store. That process does not match the T=1 definition since the bus converter would be expecting a single PIO store reply. Accordingly, for PIO stores to CF8, in order to function within the T=1 definition, a "broadcast address" technique is used. The CF8 address is broadcast to all PHBs, but only the primary PHB is allowed to return a PIO store reply packet. All other PHBs are required to process the transaction but are not allowed to return a PIO store reply packet.

The PowerPC System Bus definition allows for a target of a PIO store operation to retry the operation which causes the initiator (in this case the Bus Converter) to re-issue the exact same command. If all PHBs are accepting a PIO store to CF8, but one of the PHBs must retry the operation, the retry would cause the initiator to re-send the operation. In that case, all PHBs must be aware of the retry so that the PHBs are not attempting to execute that store operation. If a PHB were not aware of the retry by another device and was attempting to execute that store operation, that PHB may be "busy" when the initiator re-issues the command causing the PHB to now retry the operation. This case may lead to a "livelock" situation of alternating devices retrying while they execute the store. In the exemplary embodiment (FIG. 6), all PHBs are required to monitor for a condition called "third party retry" in which a device other than the PHB has retried the operation. For example, if a PHB has detected that another PHB has retried a PIO Store to the Configuration Address Register, it will ignore the operation. Only when all PHBs have successfully received the PIO store data will the operation be complete. The completion of the operation is indicated by the transaction completing with no PHB retries.

For a T=1 PIO Load operation (FIG. 4), load data is to be returned to the initiator by the device targeted by the load. Since all devices must respond to CF8 accesses, multiple devices would attempt to return load data, but the initiator would only expect one data transfer returned. Accordingly, for loads from the Configuration Address Register, only the primary PHB will return Load Data since all PHBs will have an identical copy of this data. All other PHBs will ignore PIO Load operations to address CF8.

Figure 5:
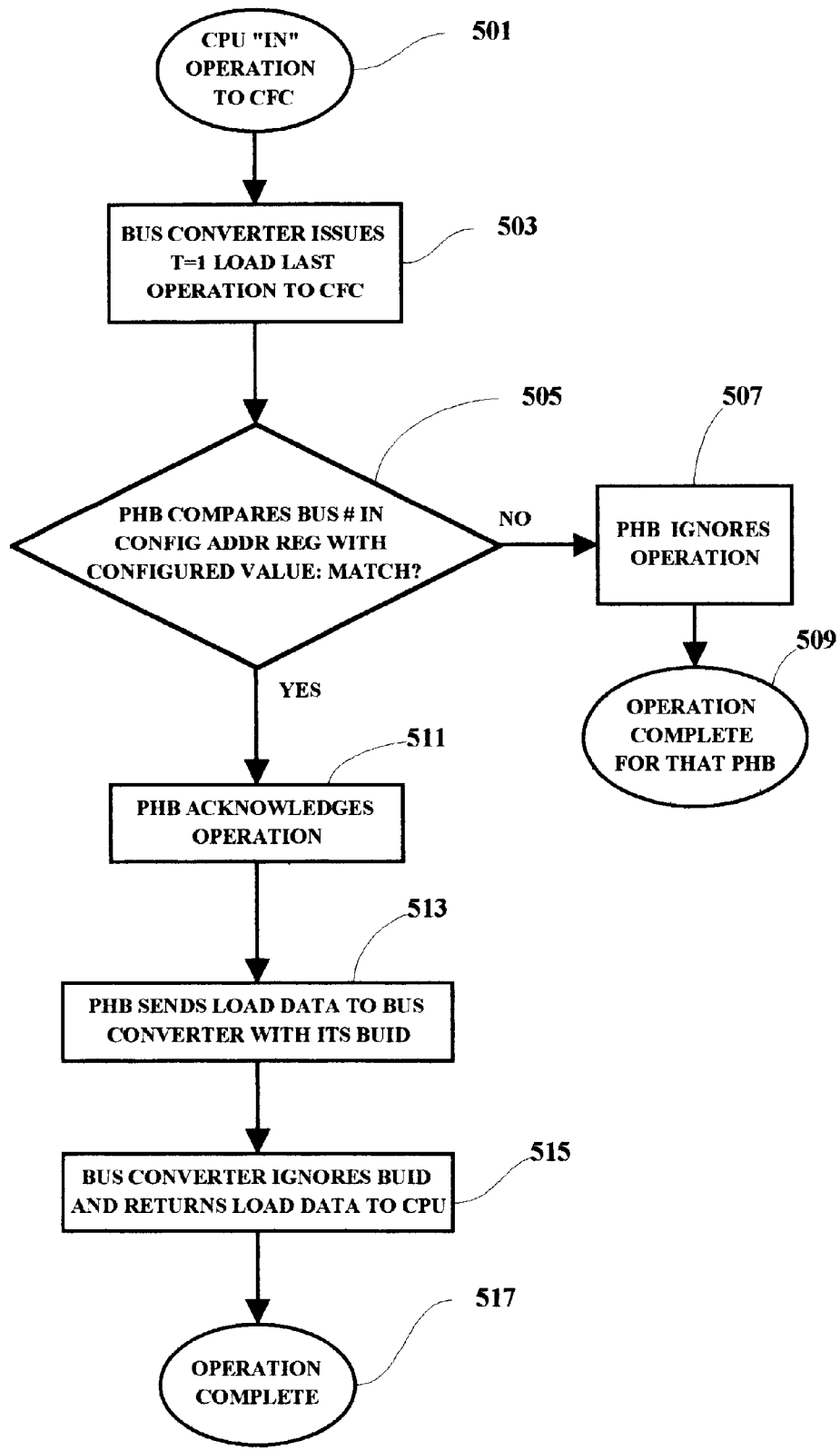
FIG. 5 is a flowchart illustrating a CPU IN operation to CFC.

In the example, all CF8/CFC accesses are generated using the same BUID (bus unit identifier). For PIO Loads and Stores to the Configuration Data Registers (four bytes at address CFC, CFD, CFE and CFF), a device would need to not use the BUID to decode this address range. Once the Configuration Address has been written to all PHBS, the PHBs must use the bus number portion of this register to decode accesses to the address range of CFC to CFF (FIG. 5).

For PIO Stores to the Configuration Data Register, the PHB which was targeted (by the Bus Number in the Configuration Address Register) is required to send a PIO Store Reply packet to the initiator to indicate that the Store operation had completed successfully. Since the PIO Store Reply packet contains the BUID, the initiator is required to either ignore the BUID returned with this PIO Store Reply packet or be able to receive multiple BUIDs when issuing a PIO Store to this register. In both cases, the initiator (in this case the Bus Converter 207) would then use the PIO Store Reply packet to indicate to the CPU that the instruction had completed.

Figure 3:
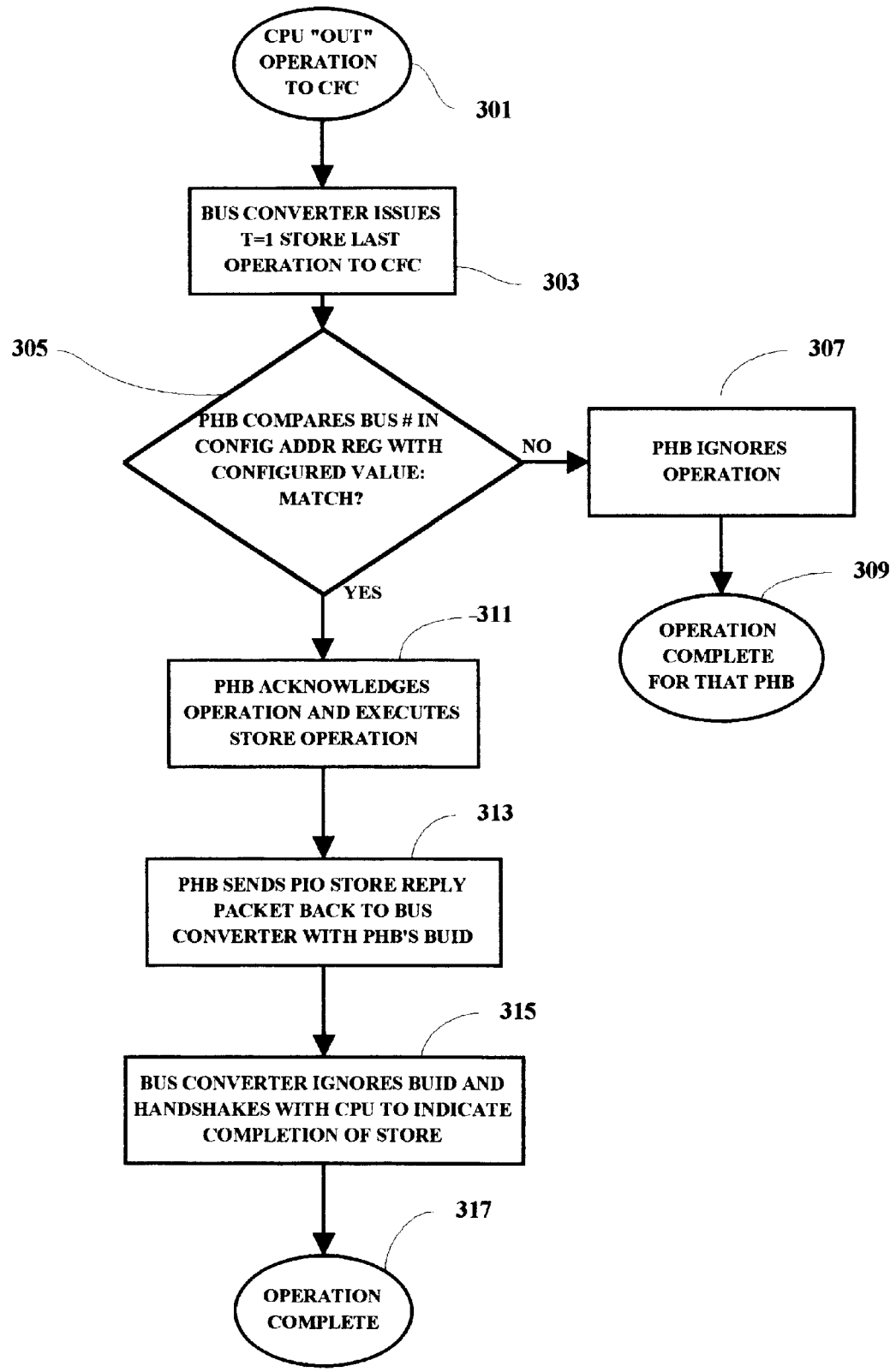
FIG. 3 is a flowchart illustrating a CPU OUT operation to CFC.

FIG. 3 is a flowchart illustrating a CPU OUT operation to CFC in greater detail. When the process begins 301, the bus converter issues a T=1 "Store Last Operation To CFC" 303. Next, the PHB compares the bus number in the Configuration Address Register with the Configured Value and determines if there is a match 305. If there is no match, the PHB ignores the operation 307 and the operation is complete for that PHB 309. If there is a match however, the PHB acknowledges the operation and executes the Store operation 311. Next, the PHB sends a PIO Store Reply Packet back to the Bus Converter 207 with the PHB's BUID 313. The Bus Converter ignores the BUID and handshakes with the appropriate requesting CPU to indicate completion of the Store 315, and the operation is completed 317.

Figure 4:
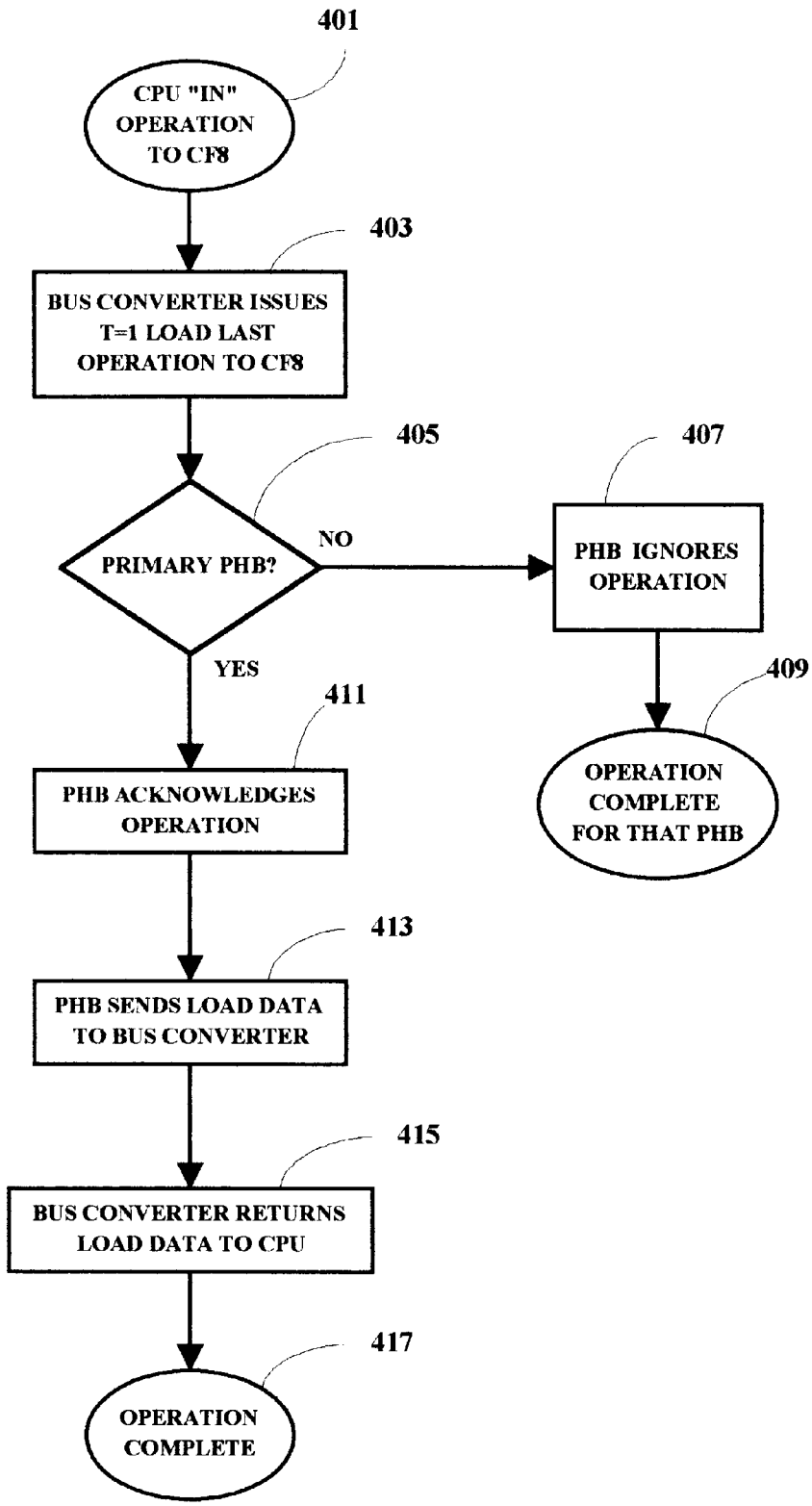
FIG. 4 is a flowchart illustrating a CPU IN operation to CF8.

FIG. 4 is a flowchart illustrating a CPU IN operation to CF8. As illustrated, as the operation is initiated 401, the Bus Converter 207 issues 403 a T=1 Load Last Operation To CF8. A determination is then made as to whether or not the PHB is a primary PHB 405. If the PHB is not a primary PHB 211, the PHB ignores the operation 407 and the operation is completed for that PHB 409. If the PHB is a primary PHB 211, the PHB 211 acknowledges the operation 411 and sends 413 load data to the Bus Converter 207. The Bus Converter 207 then returns the data to the CPU 415 and the operation is complete.

FIG. 5 is a flowchart illustrating a CPU IN operation to CFC. When the process begins 501, the Bus Converter 207 issues a T=1 Load Last operation to CFC 503. Next, the PHB compares the bus number in the Configuration Address Register with the configured value and determines if there is a match 505. If there is no match, the PHB ignores the operation 507 and the operation is complete for that PHB 509. If however, there is a match, the PHB acknowledges the operation 511 and sends 513 load data to the Bus Converter 207 with the PHB's BUID. The Bus Converter 207 will then ignore the BUID and return the load data to the appropriate CPU 515, and the operation is complete 517.

Figure 6:
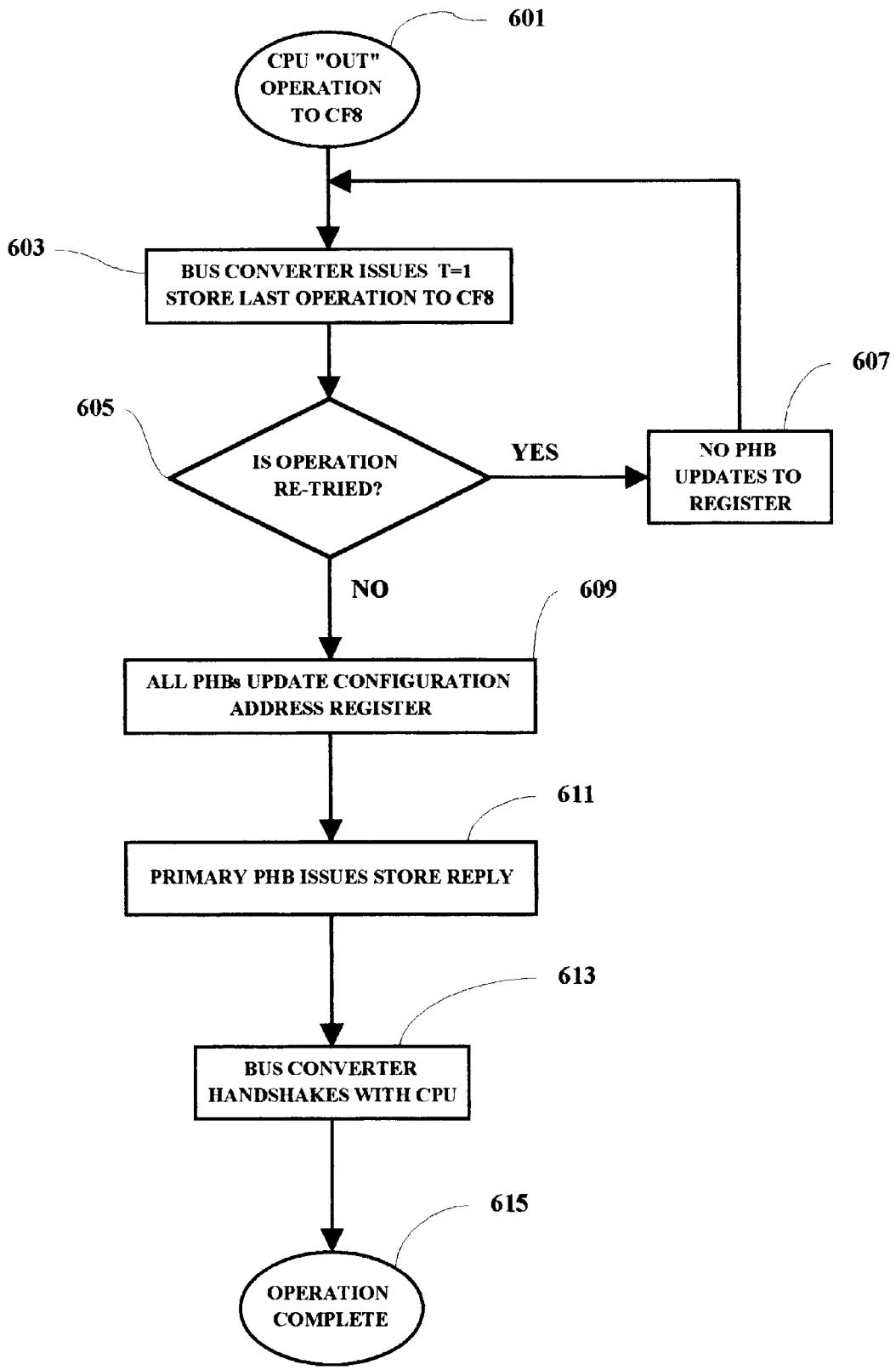
FIG. 6 is a flowchart illustrating a CPU OUT operation to CF8.

FIG. 6 is a flowchart illustrating a CPU OUT operation to CF8. After the process begins 601, the bus converter issues a T=1 store last operation 603 to CF8. A determination is then made as to whether the operation is a re-try 605. If the operation is a re-try, then there are no PHB updates to the register 607 and the process returns to step 603. If the operation is not a re-try, all PHBs update their copy of the configuration address register 609 and the primary PHB issues a store reply 611. The bus converter 207 then "handshakes" with the CPU 613 and the operation is completed 615.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for processing a CPU request for configuration data in a multi-bus system, said CPU request being issued by a CPU in a first level bus system, said method comprising:

converting said CPU request to an equivalent request in a second level bus system by a bus converter circuit connected between said first level bus system and said second level bus system;

determining which of a plurality of bus bridge circuits contains data identified in said equivalent request, said bus bridge circuits being connected between said second level bus system and a corresponding plurality, respectively, of bus arrangements in a third level bus system;

acknowledging said equivalent request by one of said bus bridge circuits if an address containing said configuration data is within a range of addresses monitored by said one of said bus bridge circuits;

sending said requested configuration data from said one of said bus bridge circuits to said bus converter circuit; and returning said requested data from said converter circuit to said CPU in response to said CPU request.

2. The method as set forth in claim 1 wherein said first level bus system is an X86 bus system, said second level bus system is a PowerPC bus system and said third level bus system is a PCI bus system.

3. The method as set forth in claim 1 wherein said plurality of bus bridge circuits comprises at least one primary bridge circuit, said primary bridge circuit being arranged to monitor addresses of secondary bridge circuits associated with said primary bridge circuit, said primary bridge circuit being selectively operable to accomplish said acknowledging exclusively of said secondary bridge circuits when said address containing said configuration data is within a range of addresses monitored by said primary bridge circuit.

4. The method as set forth in claim 1 wherein said determining is accomplished by:

comparing a bus number in a configuration address register in said bus bridge circuits with a configured value, said acknowledging being accomplished when a match occurs between said bus number in said configuration address register and said configured value.

5. A method for processing a CPU configuration store instruction to store configuration data to a configuration address in a multi-bus system, said store instruction being issued by said CPU in a first level bus system, said method comprising:

converting said CPU store instruction to an equivalent instruction for a store operation in a second level bus system by a bus converter circuit connected between said first level bus system and said second level bus system, said second level bus system being connected to a third level bus system by a plurality of bus bridge circuits;

comparing a bus number in a bridge circuit configuration address register with a configured value;

acknowledging said store operation and executing said store operation when a match occurs between said bus number in said configuration address register and said configured value;

sending store reply information to said bus converter circuit, said store reply information containing an identification number representative of said bridge circuit; and sending a completion signal from said converter circuit to said CPU, said completion signal being indicative of a completion of said store operation.

6. The method as set forth in claim 5 wherein said first level bus system is an X86 bus system, said second level bus system is a PowerPc bus system and said third level bus system is a PCI bus system.

7. A method for processing a CPU configuration store instruction to store configuration data to a configuration address in a multi-bus system, said store instruction being issued by said CPU in a first level bus system, said method comprising:

converting said CPU store instruction to an equivalent instruction for a store operation in a second level bus system by a bus converter circuit connected between said first level bus system and said second level bus system, said second level bus system being connected to a third level bus system by a plurality of bus bridge circuits, wherein one of said bus bridge circuits is a primary bus bridge circuit;

determining whether said store operation is a retry of a previous store operation;

having configuration address registers in all of said bus bridge circuits updated if said store operation is not a retry of a previous store operation;

issuing a store reply by said primary bridge circuit to said bus converter; and sending a completion signal from said converter circuit to said CPU, said completion signal being indicative of a completion of said store operation.

8. The method as set forth in claim 5 wherein said first level bus system is an X86 bus system, said second level bus system is a PowerPC bus system and said third level bus system is a PCI bus system.

9. An information processing system comprising:

a first bus system, said first bus system having at least one central processing unit coupled thereto;

a second bus system;

a bus converter circuit connected between said first bus system and said second bus system;

a third bus system; and a plurality of bridge circuits connecting said second bus system to a corresponding plurality of bus arrangements within said third bus system, each of said bus arrangements being coupled to a corresponding one of said plurality of bridge circuits, said bus converter circuit being responsive to a request for transfer of configuration data issued by said one central processing unit for converting said request to a corresponding request in said second bus system, said bridge circuits being responsive to said corresponding request for interfacing between said second bus system and said third bus system in transferring data in accordance with said request, wherein said request for transfer of configuration data is a read request for reading configuration data from a location in said third bus system to said central processing unit.

10. An information processing system comprising:

a first bus system, said first bus system having at least one central processing unit coupled thereto;

a second bus system;

a bus converter circuit connected between said first bus system and said second bus system;

a third bus system; and a plurality of bridge circuits connecting said second bus system to a corresponding plurality of bus arrangements within said third bus system, each of said bus arrangements being coupled to a corresponding one of said plurality of bridge circuits, said bus converter circuit being responsive to a request for transfer of configuration data issued by said one central processing unit for converting said request to a corresponding request in said second bus system, said bridge circuits being responsive to said corresponding request for interfacing between said second bus system and said third bus system in transferring data in accordance with said request, wherein said request for transfer of configuration data is a store request for storing configuration data from said central processing unit to a location in said third bus system.

11. An information processing system comprising:

a first bus system, said first bus system having at least one central processing unit coupled thereto;

a second bus system;

a bus converter circuit connected between said first bus system and said second bus system;

a third bus system; and a plurality of bridge circuits connecting said second bus system to a corresponding plurality of bus arrangements within said third bus system, each of said bus arrangements being coupled to a corresponding one of said plurality of bridge circuits, said bus converter circuit being responsive to a request for transfer of configuration data issued by said one central processing unit for converting said request to a corresponding request in said second bus system, said bridge circuits being responsive to said corresponding request for interfacing between said second bus system and said third bus system in transferring data in accordance with said request, wherein said plurality of bridge circuits is comprised of at least a single primary bridge circuit and at least one secondary peer bridge circuit associated therewith, said primary bridge circuit being arranged to exclusively interface with said bus converter circuit for transactions involving said primary bridge circuit and said secondary bridge circuit.

* * * * *